United States Patent
Swab et al.

(10) Patent No.: US 10,220,397 B2
(45) Date of Patent: Mar. 5, 2019

(54) FOAM DISPENSING APPARATUS

(75) Inventors: John H. Swab, Simpsonville, SC (US); Matthew C. Dunlap, Taylor, MI (US); William Rowand, Phil Campbell, AL (US)

(73) Assignee: BASF SE, Ludwigshafen am Rhein (DE)

( * ) Notice: Subject to any disclaimer, the term of this patent is extended or adjusted under 35 U.S.C. 154(b) by 1000 days.

(21) Appl. No.: 12/951,741

(22) Filed: Nov. 22, 2010

(65) Prior Publication Data

US 2011/0121034 A1 May 26, 2011

Related U.S. Application Data

(60) Provisional application No. 61/263,718, filed on Nov. 23, 2009.

(51) Int. Cl.
*B05B 7/04* (2006.01)
*B05B 7/00* (2006.01)
(Continued)

(52) U.S. Cl.
CPC .............. *B05B 7/0025* (2013.01); *B05B 7/12* (2013.01); *B05B 15/55* (2018.02); *B05B 15/557* (2018.02);
(Continued)

(58) Field of Classification Search
CPC ..... B05B 7/0025; B05B 15/557; B05B 15/55; B05B 7/12; B05B 12/004; B05B 7/0408; B05B 12/02; B29B 7/803; B29B 7/447
(Continued)

(56) References Cited

U.S. PATENT DOCUMENTS

| | | | |
|---|---|---|---|
| 334,011 A | 1/1886 | Franklin | |
| 3,741,242 A * | 6/1973 | Hansen | ............... F16K 17/0433 137/269 |

(Continued)

FOREIGN PATENT DOCUMENTS

| | | |
|---|---|---|
| DE | 2806102 A1 | 2/1978 |
| DE | 2934825 A1 | 8/1979 |

(Continued)

OTHER PUBLICATIONS

English translation of DE 2934825, extracted from espacenet.com, 17 pages.

(Continued)

*Primary Examiner* — Darren W Gorman
*Assistant Examiner* — Joel Zhou
(74) *Attorney, Agent, or Firm* — DLA Piper LLP (US)

(57) ABSTRACT

A foam dispensing apparatus is capable of dispensing a mixture of a resin component and an isocyanate component. The foam dispensing apparatus includes a resin line and an isocyanate line connected to a manifold. A nozzle is connected to the manifold and the mixture is dispensed through the nozzle. The manifold defines a resin duct in communication with the resin line and the nozzle and an isocyanate duct in communication with the isocyanate line and the nozzle. At least one valve is connected to the resin and isocyanate lines and is moveable between an open position allowing flow through the resin and isocyanate lines and a closed position preventing flow through the resin and isocyanate lines. The valve is disposed exterior to the manifold and the flow is unregulated in the manifold for reducing maintenance of the manifold.

19 Claims, 4 Drawing Sheets

(51) Int. Cl.
*B05B 7/12* (2006.01)
*B29B 7/74* (2006.01)
*B29B 7/80* (2006.01)
*B05B 15/55* (2018.01)
*B05B 12/00* (2018.01)
*B05B 12/02* (2006.01)

(52) U.S. Cl.
CPC ............ *B29B 7/7447* (2013.01); *B29B 7/803* (2013.01); *B05B 7/0408* (2013.01); *B05B 12/004* (2013.01); *B05B 12/02* (2013.01)

(58) Field of Classification Search
USPC .... 239/398, 114, 118, 123; 222/1, 136, 145; 137/504
See application file for complete search history.

(56) References Cited

U.S. PATENT DOCUMENTS

| | | | |
|---|---|---|---|
| 3,795,364 | A | 3/1974 | Kattner |
| 3,882,052 | A | 5/1975 | Raynor et al. |
| 4,234,007 | A | 11/1980 | Titone |
| 5,086,949 | A * | 2/1992 | Vulpitta et al. ................... 222/1 |
| 5,246,143 | A * | 9/1993 | Cherfane ................... 222/145.2 |
| 5,360,831 | A | 11/1994 | Lidy et al. |
| 5,388,764 | A | 2/1995 | Moses |
| 5,403,088 | A | 4/1995 | Killmer et al. |
| 5,878,766 | A | 3/1999 | Dekhtyar |
| 6,534,556 | B2 | 3/2003 | Lacarte et al. |
| 6,688,319 | B2 | 2/2004 | Trantham et al. |
| 6,793,098 | B2 * | 9/2004 | Huber et al. ...................... 222/1 |
| 6,797,736 | B1 | 9/2004 | Smiecinski et al. |
| 6,945,274 | B1 * | 9/2005 | Davis ...................... 137/624.11 |
| 7,156,120 | B2 * | 1/2007 | Cherfane et al. ............. 137/504 |
| 7,350,672 | B1 | 4/2008 | Gerich |
| 2003/0150872 | A1 | 8/2003 | Huber et al. |
| 2004/0124268 | A1 | 7/2004 | Frazier et al. |
| 2005/0103889 | A1 | 5/2005 | Langeman |
| 2006/0021657 | A1 | 2/2006 | Cherfane et al. |
| 2006/0076064 | A1 | 4/2006 | Carter |
| 2010/0065130 | A1 | 3/2010 | Swab |
| 2010/0065768 | A1 | 3/2010 | Swab |
| 2010/0069517 | A1 | 3/2010 | Swab |

FOREIGN PATENT DOCUMENTS

| | | | |
|---|---|---|---|
| DE | 2934825 | * | 3/1981 |
| EP | 1353254 | A2 | 10/2003 |
| EP | 1712821 | A1 | 10/2006 |
| FR | 2535435 | A1 | 5/1984 |
| WO | WO2009135490 | * | 12/2009 |

OTHER PUBLICATIONS

English translation of DE 2806102 A1, extracted from espacenet.com, 22 pages.
PCT International Search Report PCT/EP2010/067929, dated Mar. 17, 2011, 6 pages.
The Dow Chemical Company, "Dow Polyurethane Systems Products," The Dow Chemical Company website; www.dow.com/pusystems/product/deltagun.htm, accessed Jan. 28, 2008.
BASF Corporation, "BASF Polyurethanes—Building and Construction"; The BASF Corporation website,; http://www2.basf.us/urethanechemicals/Specialty_Systems/equipment_bc.html, accessed Jan. 28, 2008.
English language abstract for FR 2535435 extracted from espacenet.com database, dated Mar. 24, 2011, 12 pages.

* cited by examiner

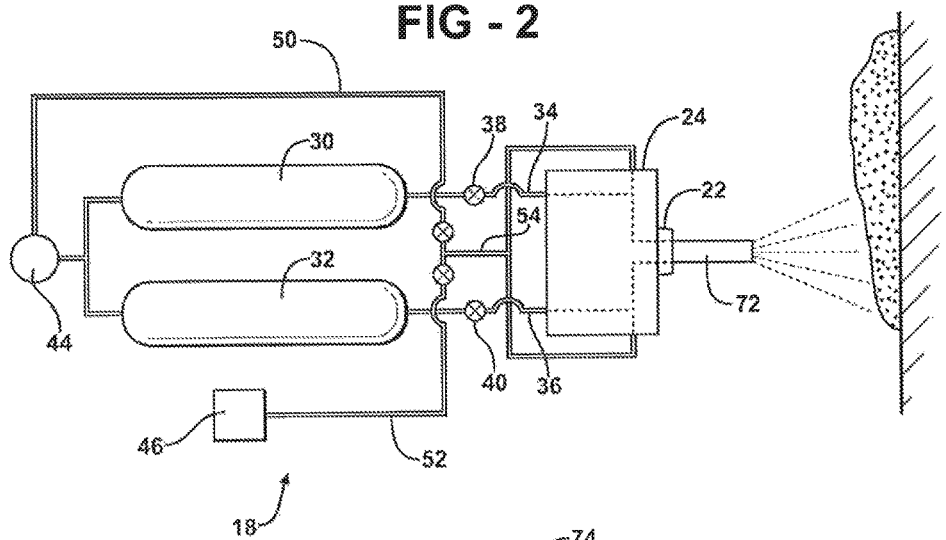
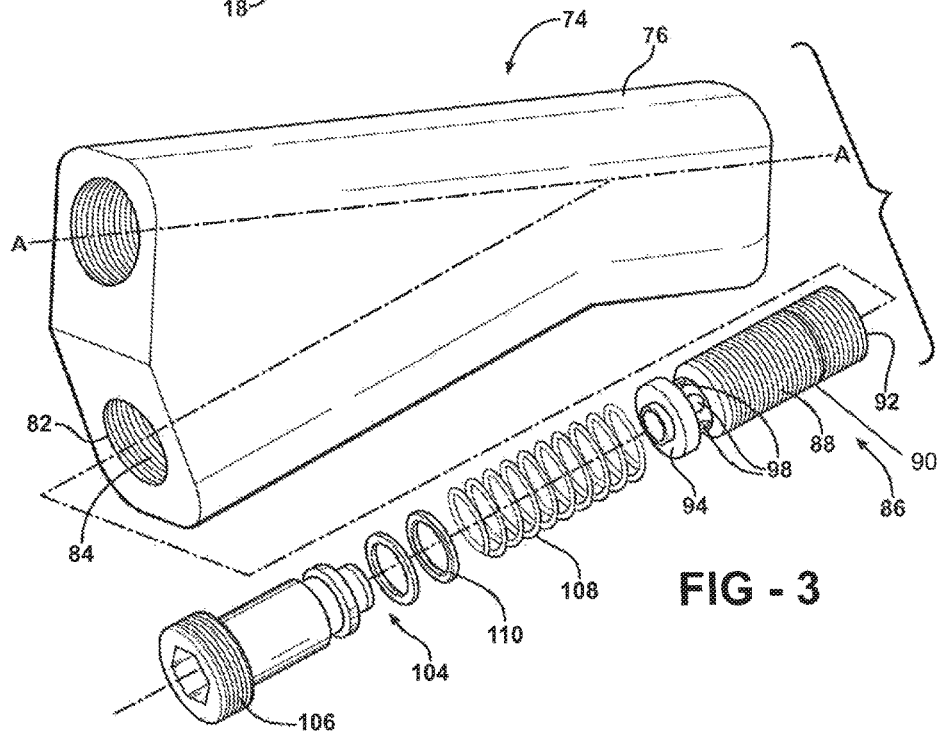

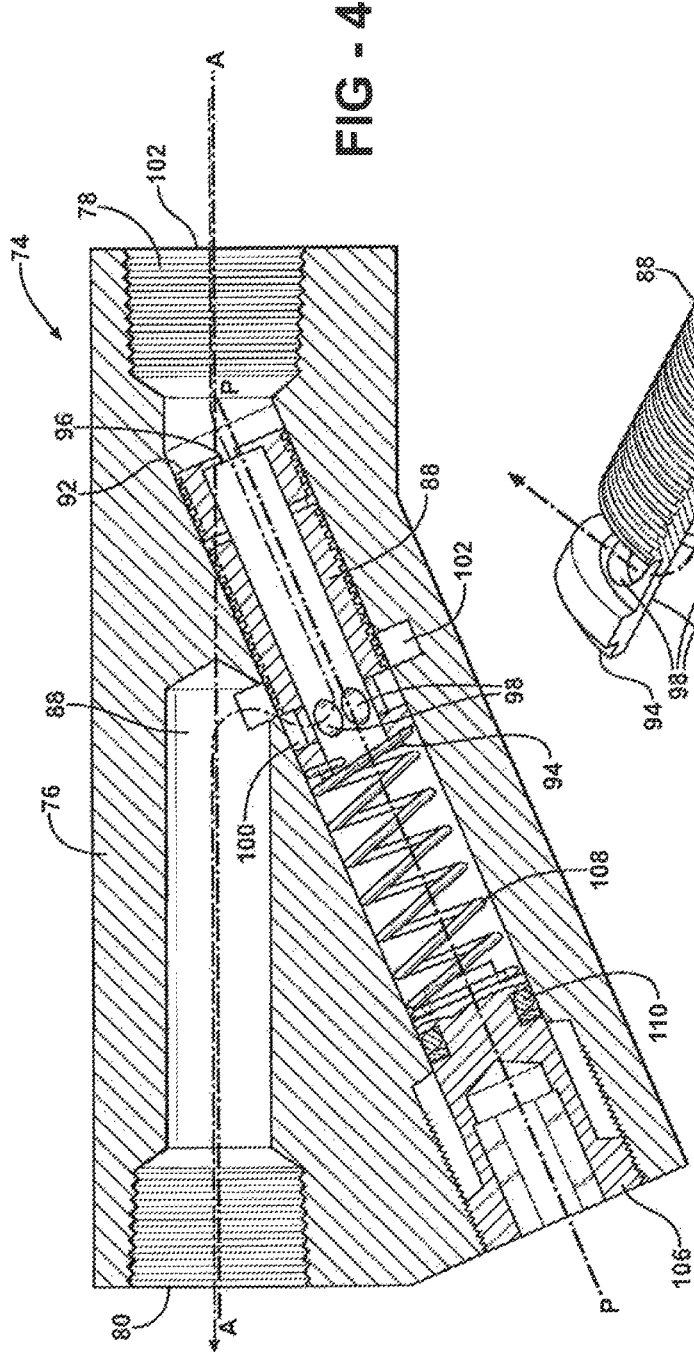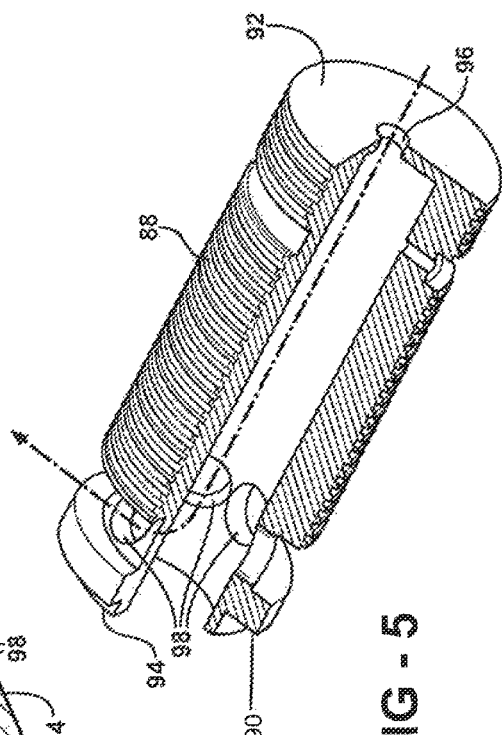

FOAM DISPENSING APPARATUS

CROSS-REFERENCE TO RELATED APPLICATIONS

The subject patent application claims priority to and all the benefits of U.S. Provisional Patent Application Ser. No. 61/263,718 which was filed on Nov. 23, 2009, the entire specification of which is expressly incorporated herein by reference.

BACKGROUND OF THE INVENTION

1. Field of the Invention

The subject invention generally relates to a foam dispensing apparatus and more particularly a foam dispensing apparatus for dispensing a mixture of a resin component and an isocyanate component.

2. Description of the Related Art

Chemical foam compositions, such as polyurethane foams, are presently well known and used in a number of different applications. Polyurethane foams are useful in such applications as thermal insulation, marine floatation, coatings, and packaging. Polyurethane foams are formed by the mixture of a resin component and an isocyanate component.

The resin component and the isocyanate component are separately stored in tanks until use. The resin and isocyanate components are mixed in a foam dispensing apparatus and are dispensed therefrom as polyurethane foam. The tanks storing the resin component and the isocyanate component and the foam dispensing apparatus are pressurized to drive the resin and isocyanate components from the tanks and through the foam dispensing apparatus.

The tanks and the foam dispensing apparatus are pressurized by either a low pressure system or a high pressure system. The low pressure system uses gas pressure to pressurize the tanks and the foam dispensing apparatus. The low pressure system operates in a pressure range of 100-500 psi (pounds per square inch) and creates a flow rate of 0.4-5 gpm (gallons per minute) for each of the resin and isocyanate components, i.e., the low pressure system can dispense polyurethane foam at a flow rate of 6-10 gpm. Because the low pressure system is pressurized by gas and operates at relatively low pressures, the low pressure system is relatively small and therefore relatively easy to transport and maneuver. In addition, the low pressure system is relatively inexpensive to manufacture. However, the flow rate of the polyurethane being dispensed from the foam dispensing apparatus is relatively low, which disadvantageously increases the amount of time to dispense a given amount of polyurethane foam.

The high pressure system operates in a pressure range of 1500 to 6000 psi and creates a flow rate of each of the resin and isocyanate components of 4-50 gpm, i.e., the high pressure system can dispense polyurethane foam at 8-100 gpm. However, high pressure systems include large pumps and a large amount of relatively thick pipes. As a result, high pressure systems are disadvantageously large and therefore are difficult to transport and maneuver. In addition, high pressure systems are very expensive relative to low pressure systems.

It would be advantageous to develop a foam dispensing apparatus that dispenses polyurethane foam at a relatively high flow rate while maintaining the foam dispensing apparatus at a relatively small size and a relatively inexpensive cost to manufacture and maintain.

SUMMARY OF THE INVENTION AND ADVANTAGES

The present invention includes a foam dispensing apparatus for dispensing a mixture of a resin component and an isocyanate component. The foam dispensing apparatus comprises a resin line for carrying the resin component and an isocyanate line for carrying the isocyanate component. The foam dispensing apparatus further comprises a nozzle for dispensing the resin and isocyanate components from the foam dispensing apparatus. A manifold is connected to the nozzle. The manifold defines a resin duct in communication with the resin line and the nozzle for directing the resin component toward the nozzle and an isocyanate duct in communication with the isocyanate line and the nozzle for directing the isocyanate component toward the nozzle. At least one valve is connected to the resin and isocyanate lines and is moveable between an open position allowing flow through the resin and isocyanate lines and a closed position preventing flow through the resin and isocyanate lines. The valve is disposed exterior to the manifold and the flow is unregulated in the manifold for reducing maintenance of the manifold.

The present invention also includes a foam dispensing system for dispensing a mixture of a resin component and an isocyanate component. The foam dispensing system comprises a source of resin component and a source of isocyanate component. The foam dispensing system further comprises a nozzle for mixing the resin and isocyanate components and a manifold connected to the nozzle. The manifold defines a resin duct in communication with the source of resin component and the nozzle for directing the resin component toward the nozzle and an isocyanate duct in communication with the source of isocyanate component and the nozzle for directing the isocyanate component toward the nozzle. A resin line couples the source of resin component to the resin duct and an isocyanate line couples the source of isocyanate component to the isocyanate duct. At least one valve is connected to the resin and isocyanate lines and is moveable between an open position allowing flow through the resin and isocyanate lines and a closed position preventing flow through the resin and isocyanate lines. The valve is disposed exterior to the manifold and the flow is unregulated in the manifold for reducing maintenance of the manifold.

Because the valve is disposed exterior to the manifold and flow is unregulated in the manifold, the manifold is simplified thereby advantageously reducing time and cost to manufacture the manifold. In addition, the manifold is less complex thereby reducing the time and cost associated with performing maintenance on the manifold. Specifically, the need to clean and rebuild the manifold is eliminated because the valve is disposed exterior to the manifold and flow is unregulated in the manifold. Also, since the need to clean and rebuild the manifold is eliminated, the disadvantageous loss of resin component and isocyanate component disposed in the manifold during cleaning is also eliminated.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a schematic view of a foam dispensing system including the foam dispensing apparatus;

FIG. 3 is an exploded view of a flow control valve of the foam dispensing apparatus;

FIG. 4 is cross-sectional view of the control valve;

FIG. 5 is a sectional view of a piston of the control valve; and

DETAILED DESCRIPTION OF THE INVENTION

Figure 1:
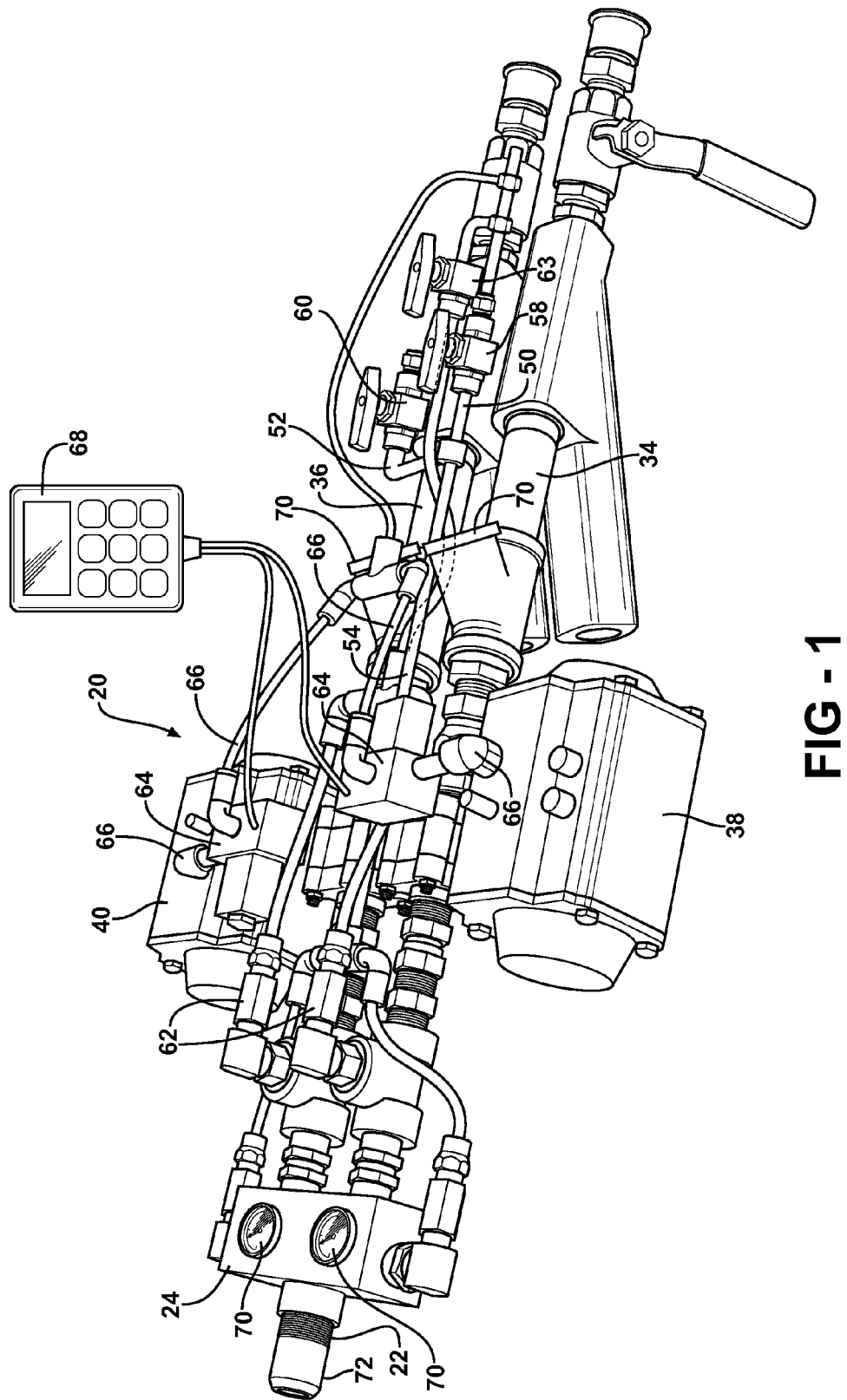
FIG. 1 is a perspective view of a foam dispensing apparatus.

Referring to the Figures, wherein like numerals indicate like parts throughout the several views, a foam dispensing system 18 is generally shown. The foam dispensing system 18 is a two component system for handling a first component and a second component. The first component is typically a resin component and the second component is typically an isocyanate component. The foam dispensing system 18 mixes the resin and isocyanate components and dispenses the mixture therefrom, as shown in FIG. 2.

With respect to the polyurethane foam, the resin and isocyanate components are rapidly mixed together. A rapid cross-linking reaction and foam expansion commences, which ultimately yields the low density but relative high load bearing rigid polyurethane foam. The application of the polyurethane foam can, for example, be used for thermal insulation such as for appliances or buildings, marine floatation, coatings, and packaging. It is to be appreciated that the resin component and the isocyanate component can include foaming agents, curing agents, catalysts, accelerators, as well as other modifying additives. It is to be appreciated that in other applications, the first component, the second component, a tertiary component, and subsequent components may comprise other materials.

The isocyanate component may include, but is not limited to, isocyanates, diisocyanates, polyisocyanates, biurets of isocyanates and polyisocyanates, isocyanurates of isocyanates and polyisocyanates, and combinations thereof. In one embodiment, the isocyanate component includes an n-functional isocyanate. "n" may be a number from 2 to 5, from 2 to 4, or from 3 to 4. It is to be understood that n may be an integer or may have intermediate values from 2 to 5. The isocyanate component may include an isocyanate selected from the group of aromatic isocyanates, aliphatic isocyanates, and combinations thereof. In another embodiment, the isocyanate component includes an aliphatic isocyanate such as hexamethylene diisocyanate, H12MDI, and combinations thereof. If the isocyanate component includes an aliphatic isocyanate, the isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate component may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof.

Alternatively, the isocyanate component may include an aromatic isocyanate. If the isocyanate component includes an aromatic isocyanate, the aromatic isocyanate may correspond to the formula R' (NCO)$_z$ wherein R' is aromatic and z is an integer that corresponds to the valence of R'. Preferably, z is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethyolpropane, and combinations thereof. In one embodiment, the isocyanate component includes a diisocyanate selected from the group of methylene diphenyl diisocyanates, toluene diisocyanates, hexamethylene diisocyanates, H12MDIs, and combinations thereof.

The isocyanate component may have any % NCO content and any viscosity. The isocyanate component may also react with the resin and/or chain extender in any amount, as determined by one skilled in the art. Preferably, the isocyanate component and the resin and/or chain extender are reacted at an isocyanate index from 15 to 900, more preferably from 95 to 130, and alternatively from 105 to 130.

The resin component of the instant invention may include one or more of a polyether polyol, a polyester polyol, and combinations thereof. As is known in the art, polyether polyols are typically formed from a reaction of an initiator and an alkylene oxide. Preferably, the initiator is selected from the group of aliphatic initiators, aromatic initiators, and combinations thereof. In one embodiment, the initiator is selected from the group of ethylene glycol, propylene glycol, dipropylene glycol, butylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, butenediol, butynediol, xylylene glycols, amylene glycols, 1,4-phenylene-bis-beta-hydroxy ethyl ether, 1,3-phenylene-bis-beta-hydroxy ethyl ether, bis-(hydroxy-methyl-cyclohexane), thiodiglycol, glycerol, 1,1,1-trimethylolpropane, 1,1,1-trimethylolethane, 1,2,6-hexanetriol, α-methyl glucoside, pentaerythritol, sorbitol, aniline, o-chloroaniline, p-aminoaniline, 1,5-diaminonaphthalene, methylene dianiline, the condensation products of aniline and formaldehyde, 2,3-, 2,6-, 3,4-, 2,5-, and 2,4-diaminotoluene and isomeric mixtures, methylamine, triisopropanolamine, ethylenediamine, 1,3-diaminopropane, 1,3-diaminobutane, 1,4-diaminobutane, propylene diamine, butylene diamine, hexamethylene diamine, cyclohexalene diamine, phenylene diamine, tolylene diamine, xylylene diamine, 3,3'-dichlorobenzidine, 3,3'-and dinitrobenzidine, alkanol amines including ethanol amine, aminopropyl alcohol, 2,2-dimethyl propanol amine, 3-aminocyclohexyl alcohol, and p-aminobenzyl alcohol, and combinations thereof. It is contemplated that any suitable initiator known in the art may be used in the present invention.

Preferably, the alkylene oxide that reacts with the initiator to form the polyether polyol is selected from the group of ethylene oxide, propylene oxide, butylene oxide, amylene oxide, tetrahydrofuran, alkylene oxide-tetrahydrofuran mixtures, epihalohydrins, aralkylene oxides, and combinations thereof. More preferably, the alkylene oxide is selected from the group of ethylene oxide, propylene oxide, and combinations thereof. Most preferably, the alkylene oxide includes ethylene oxide. However, it is also contemplated that any suitable alkylene oxide that is known in the art may be used in the present invention.

The polyether polyol may include an ethylene oxide cap of from 5 to 20% by weight based on the total weight of the polyether polyol. It is to be understood that the terminology "cap" refers to a terminal portion of the polyether polyol. Without intending to be bound by any particular theory, it is believed that the ethylene oxide cap promotes an increase in a rate of the reaction of the polyether polyol and the isocyanate.

The polyether polyol may also have a number average molecular weight of from 18 to 10,000 g/mol. Further, the polyether polyol may have a hydroxyl number of from 15 to 6,250 mg KOH/g. The polyether polyol may also have a nominal functionality of from 2 to 8. Further, further, the polyether polyol may also include an organic functional group selected from the group of a carboxyl group, an amine group, a carbamate group, an amide group, and an epoxy group.

Referring now to the polyester polyols introduced above, the polyester polyols may be produced from a reaction of a dicarboxylic acid and a glycol having at least one primary hydroxyl group. Suitable dicarboxylic acids may be selected from the group of, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. Suitable glycols include, but are not limited to, those described above.

The polyester polyol may also have a number average molecular weight of from 80 to 1500 g/mol. Further, the polyester polyol may have a hydroxyl number of from 40 to 600 mg KOH/g. The polyester polyol may also have a nominal functionality of from 2 to 8. Further, further, the polyester polyol may also include an organic functional group selected from the group of a carboxyl group, an amine group, a carbamate group, an amide group, and an epoxy group.

It is to be appreciated that the resin component can include additives. The additives may be selected from the group of chain extenders, anti-foaming agents, processing additives, plasticizers, chain terminators, surface-active agents, adhesion promoters, flame retardants, anti-oxidants, water scavengers, fumed silicas, dyes, ultraviolet light stabilizers, fillers, thixotropic agents, silicones, transition metals, catalysts, blowing agents, surfactants, cross-linkers, inert diluents, and combinations thereof. The additives may be included in any amount as desired by those of skill in the art.

As shown in FIG. 2, the foam dispensing system 18 includes a foam dispensing apparatus 20 connected to a source 30 of resin component and a source 32 of isocyanate component. The foam dispensing apparatus 20 combines the resin component and the isocyanate component and sprays the mixture as set forth above. The foam dispensing apparatus 20 is typically sized so as to be easily carried and maneuvered by a user so that the mixture can be sprayed in selected locations and directions.

The source 30 of resin component and the source 32 of isocyanate component are each typically a pressurized cylinder that stores the resin and isocyanate components, respectively. It is to be appreciated that the sources 30, 32 of resin and isocyanate components can be any type of pressurized tank without departing from the nature of the present invention. In any event, the sources 30, 32 of resin and isocyanate components maintain the resin and the isocyanate components separated from each other.

Figure 6:
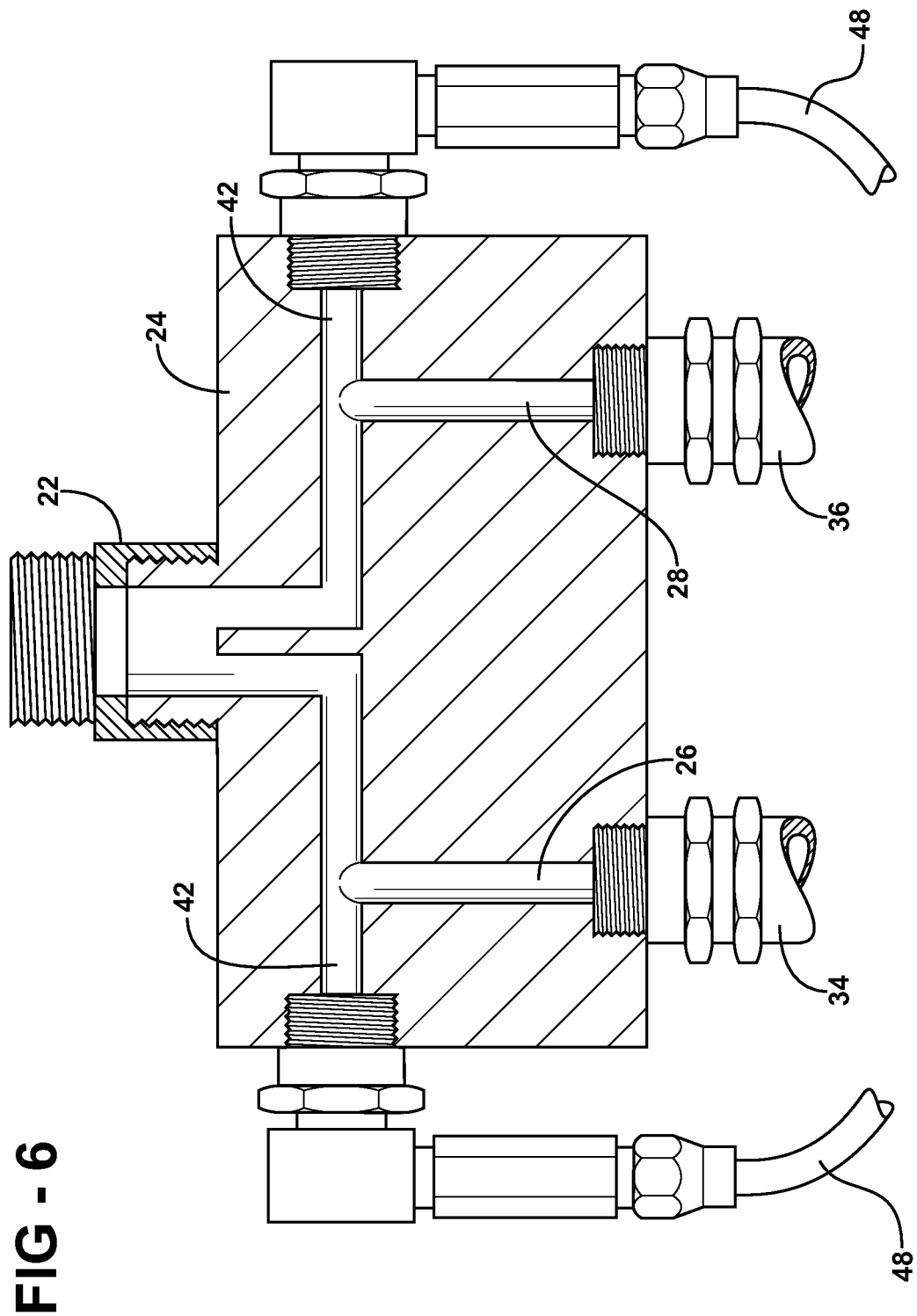
FIG. 6 is a cross-sectional view of a portion of the foam dispensing apparatus including a manifold.

As best shown in FIG. 1, the foam dispensing apparatus includes a nozzle 22 and a manifold 24 connected to the nozzle 22. With reference to FIG. 6, the manifold 24 defines a resin duct 26 and an isocyanate duct 28. The resin duct 26 is in communication with a source 30 of resin component and the nozzle 22 for directing the resin component toward the nozzle 22. The isocyanate duct 28 is in communication with a source 32 of isocyanate component and the nozzle 22 for directing the isocyanate component toward the nozzle 22.

Specifically, as shown in FIGS. 1 and 2, a resin line 34 couples the source 30 of resin component to the resin duct 26 and an isocyanate line 36 couples the source 32 of isocyanate component to the isocyanate duct 28. The resin and isocyanate lines 34, 36 can include an assortment of pipes, pipe fittings, and hoses to properly handle the resin and isocyanate components. The pipes and the pipe fittings define an inner diameter. The inner diameter is typically at least one inch. It is to be appreciated that the pipes, pipe fittings shown in the Figures are disclosed for exemplary purposes and in addition to or in the alternative to those described herein and shown in the Figures, the lines 34, 36 can include other types of tubing, conduit, etc., without departing from the nature of the present invention.

With reference to FIG. 1, at least one valve is connected to the resin and isocyanate lines 34, 36. In the embodiment shown in FIG. 1, the valve is further defined as a pair of valves, i.e., a resin valve 38 connected to the resin line 34 and an isocyanate valve 40 connected to the isocyanate line 36. The resin and isocyanate valves 38, 40 are moveable between an open position allowing flow through the resin and isocyanate lines 34, 36 and a closed position preventing flow through the resin and isocyanate lines 34, 36. In one embodiment, the valve 38, 40 is moveable to intermediate positions between the open and closed positions to restrict flow through the resin and isocyanate lines 34, 36.

The resin and isocyanate valves 38, 40 are disposed exterior to the manifold 24. In other words, the resin and isocyanate valves 38, 40 are disposed upstream of the manifold 24 to regulate the flow of the resin and isocyanate components into the manifold 24. In the embodiment shown in FIG. 1, the resin and isocyanate valves 38, 40 are spaced from the manifold 24 and are disposed along the resin and isocyanate lines 34, 36. Alternatively, the resin and isocyanate valves 38, 40 can be adjacent the manifold 24.

Flow of the resin and isocyanate components is unregulated in the manifold 24. In other words, flow within the manifold 24 is uninterrupted by valves or other flow controllers interior to the manifold 24. Specifically, the resin duct 26 and the isocyanate duct 28 are continuous and uninterrupted from the resin line 34 and the isocyanate line 36, respectively, to the nozzle 22. As such, the resin component freely flows through the resin duct 26 from the resin line 34 to the nozzle 22 and the isocyanate component freely flows through the isocyanate duct 28 from the isocyanate line 36 to the nozzle 22.

The need for a valve interior to the manifold 24 is eliminated since regulation of the flow is performed upstream of the manifold 24 with the resin and isocyanate valves 38, 40. By eliminating the need for a valve within the manifold 24, the manifold 24 is simplified thereby advantageously reducing time and cost associated with manufacturing the manifold 24. Maintenance time is also reduced by eliminating the need to clean and rebuild valves interior to the manifold 24. In addition, since the need to clean and rebuild the manifold 24 is eliminated, the loss of resin component and isocyanate component in the manifold 24 during cleaning is eliminated, which reduces material cost and reduces human exposure to the resin component and isocyanate component during maintenance.

The manifold 24 is typically formed of a single integral piece. As shown in the Figures, the manifold 24 is a single block that is altered, such as by a machining process, to define the resin and isocyanate ducts 26, 28. It is to be appreciated that the manifold 24 can be formed of several pieces subsequently connected together. In any event, the lack of a valve in the manifold 24 eliminates the necessity to disassemble the manifold 24 for maintenance of the valve.

As shown in FIG. 6, the manifold 24 can define cleaning ports 42 in communication with the resin duct 26 and the isocyanate duct 28 for supplying cleaning liquids and/or cleaning gases to flush the resin and isocyanate ducts 26, 28. As shown schematically in FIG. 2, the cleaning ports 42 can be in communication with a source of cleaning gas, such as a source 44 of compressed gas, and/or a source 46 of cleaning liquid for flushing the resin and isocyanate ducts 26, 28. As set forth further below, the source 44 of compressed gas, as shown in FIG. 2, can also be used to pressurize the sources 30, 32 of resin and isocyanate components. However, it is to be appreciated that alternatively the cleaning ports 42 can be in communication with another gas source and the cleaning gas can be any sort of gas, compressed or uncompressed, without departing from the nature of the present invention.

As shown in FIG. 1, a cleaning line 48 is in communication with the cleaning ports 42 of the manifold 24. It is to be appreciated that the cleaning line 48 and/or the manifold 24 includes a one way valve to prevent fluids from exiting the manifold 24 through the cleaning ports 42.

In one embodiment, the cleaning line 48 includes a gas branch 50 connected to the source 44 of compressed gas, a liquid branch 52 connected to the source 46 of cleaning fluid, and a main branch 54 connected to both the gas and liquid branches 50, 52 and to the cleaning ports 42. The gas branch 50 includes a gas branch valve 58 for selectively allowing communication between the source 44 of compressed gas and the main branch 54. Likewise the liquid branch 52 has a liquid branch valve 60 for selectively allowing communication between the source 46 of cleaning liquid and the main branch 54.

To supply cleaning liquid to the cleaning ports 42, the gas branch valve 58 is closed and the liquid branch valve 60 is opened. To supply cleaning gas to the cleaning ports 42, e.g., to blow out cleaning liquid from the cleaning ports 42, the liquid branch valve 60 is closed and the gas branch valve 58 is opened.

The source 46 of cleaning fluid can be, for example, a canister holding cleaning fluid. The cleaning fluid can, for example, be water. However, it is to be appreciated that the cleaning fluid may be any type of fluid without departing from the nature of the present invention.

The resin duct 26 and the isocyanate duct 28 are separate from each other between the resin and isocyanate lines 34, 36, respectively, to the nozzle 22 such that the resin and isocyanate components first mix in the nozzle 22. The nozzle 22 is removable from the manifold 24 for cleaning. For example, the nozzle 22 and the manifold 24 can be threadedly coupled.

The foam dispensing apparatus 20 can include at least one gas line 62 in communication with at least one of the resin and isocyanate lines 34, 36 between the valve 38, 40 and the manifold 24 for flushing the resin and isocyanate lines 34, 36. In the embodiment shown in the Figures, the foam dispensing apparatus 20 includes a pair of gas lines 62, one in communication with the resin line 34 and the other in communication with the isocyanate line 36. The gas lines 62 can be in communication with the source 44 of compressed gas, which, as set forth further below, can also be used to pressurize the sources 30, 32 of resin and isocyanate components. However, it is to be appreciated that alternatively the gas lines 62 can be in communication with another compressed gas source without departing from the nature of the present invention.

The gas line 62 can be pressurized to blow out resin component from the resin line 34 and isocyanate component from the isocyanate line 36 during a cleaning process. The gas lines 62 typically include valves, such as gas line valve 63, for selectively allowing gas pressure through the gas lines 62 to the resin and isocyanate lines 34, 36.

The gas lines 62 can also supply pressurized gas to the resin and isocyanate lines 34, 36 for use in dispensing the resin and isocyanate components through the manifold 24. For example, a step-down (not shown) is typically disposed between the gas lines 62 and the source 44 of compressed gas to decrease the pressure of the gas to a suitable magnitude. Alternatively, a separate pressurized gas line (not shown), such as a line from a manufacturing plant often referred to as "plant air," is connected to the gas lines for use in dispensing resin and isocyanate components through the resin and isocyanate lines 34, 36. In any event, the gas is preferably dry.

As set forth above, the source 44 of compressed gas is in communication with the sources 30, 32 of resin component and isocyanate component for pressurizing the resin and isocyanate components to move the resin and isocyanate components through the resin and isocyanate lines 34, 36, respectively. In other words, the source 44 of compressed gas pressurizes the sources 30, 32 of resin and isocyanate. The source 44 of compressed gas can be, for example, a tank of compressed air. It is to be appreciated that the compressed gas can be any type of gas.

The source 44 of compressed gas pressurizes the sources 30, 32 of resin component and isocyanate component to between 100 and 500 pounds per square inch (psi). More specifically, the sources 30, 32 of resin component and isocyanate component are typically pressurized to between 220 and 250 psi. Being in this pressure range, the foam dispensing system 20 is referred to in industry as a low pressure system. Because low pressure systems, such as the foam dispensing system 20, are pressurized by gas and operate at relatively low pressures, the low pressure systems are relatively small and therefore relatively easy to transport and maneuver. In addition, the low pressure system is relatively inexpensive to manufacture. This relatively low pressure can be achieved with gas pressure and typically does not require the use of large pumps, such as those typically permanently mounted to a truck. As set forth further below, the foam dispensing system 20 has an increased flow, i.e., output of polyurethane foam, than traditional low pressure systems.

The resin and isocyanate valves 38, 40 are typically ball valves. However, it is to be appreciated that the resin and isocyanate valves 38, 40 can be of any type without departing from the nature of the present invention.

Typically, an actuator 64 is coupled to the resin and isocyanate valves 38, 40 for moving the resin and isocyanate valves 38, 40 between the open and closed positions. The actuator 64 is typically pneumatically controlled. It is to be appreciated that the actuators 64 on the resin and isocyanate valves 38, 40 can be controlled in any way, such as hydraulically, mechanically, electrically, etc., without departing from the nature of the present invention.

In the embodiment shown in FIG. 1, the resin and isocyanate valves 38, 40 are pneumatically controlled ball valves. Pneumatic lines 66 communicate between a gas source, such as the source 44 of compressed gas, and the actuator 64. A solenoid (not shown) is disposed along the pneumatic lines 66 and is moveable to selectively allow pneumatic pressure to the actuator 64. When the solenoid prevents pneumatic pressure from being supplied to the valve 38, 40, the valve 38, 40 is in the closed position. When the solenoid allows pneumatic pressure to be supplied to the valve 38, 40, the valve 38, 40 is in the open position. In other words, the valve 38, 40 is a fail close valve so that if the solenoid and/or actuator malfunctions, such as during a power loss, the valve 38, 40 moves to the closed position.

A timer 68 is typically in communication with the actuator 64 for controlling the actuator 64. Specifically, the timer 68 is in communication with the solenoid to control the supply of pneumatic pressure to the actuator 64. Accordingly, the timer 68 controls the amount of time that the resin and isocyanate valves 38, 40 are in the open position to control the amount of polyurethane foam that is dispensed from the foam dispensing apparatus 20. Alternatively, the resin and isocyanate valves 38, 40 can be manually controlled.

At least one thermometer 70 is supported by the manifold 24 and is in communication with at least one of the resin and isocyanate ducts 26, 28 for measuring a temperature of at least one of the resin and the isocyanate components. In the embodiment shown in FIG. 1, thermometers 70 are supported by the manifold 24 with one of the thermometers 70 in communication with the resin duct 26 and with the other in communication with the isocyanate duct 28. In FIG. 1, thermometers 70 are also located along he resin and isocyanate ducts 26, 28. It is to be appreciated that foam dispensing apparatus 20 can include only one thermometer 70 or additional thermometers, as shown in FIG. 1.

The foam dispensing apparatus 20 can include a mix tube 72 connected to the nozzle 22 for further mixing the resin component and the isocyanate component. The foam dispensing apparatus 20 can, for example, include a handle (not shown) for a user to grasp and the handle permits the user to conveniently and easily manipulate and operate the foam dispensing apparatus.

The resin line 34 regulates the flow rate of the resin component and the isocyanate line 36 regulates the flow rate of the isocyanate component. The resin and isocyanate lines 34, 36 regulate flow rates such that the resin component and the isocyanate component are mixed at a proper ratio and are mixed under rapid and sufficient impingement conditions to obtain an acceptable product.

Specifically, the resin and isocyanate lines 34, 36 include a control valve 74, as shown in FIGS. 3 and 4, for controlling a flow rate of the resin and isocyanate components. Typically, the resin line 34 and the isocyanate line 36 include a separate control valve 74. The control valve 74 of each of the resin and isocyanate lines 34, 36 are typically minor images of each other and, for simplicity, the following description is applicable to both of the control valves 74. As set forth in greater detail below, the control valve 74 is in-line and can be adjusted without disassembling from the resin and isocyanate lines 34, 36.

The control valve 74 regulates a flow rate of the component therethrough. Referring to FIGS. 3 and 4, the control valve 74 comprises a housing 76. Preferably, the housing 76 is manufactured from aluminum. However, it is to be appreciated that the housing 76 may be manufactured from some other material capable of conducting the component therethrough under pressure. The material utilized for the housing 76 is typically chemically resistant to the specific component flowing therethrough.

The housing 76 defines an inlet chamber 78 and an outlet chamber 80. The outlet chamber 80 is spaced from the inlet chamber 78 and is disposed along an outlet axis A. The inlet chamber 78 and the outlet chamber 80 are configured to accept the resin line 34 or isocyanate line 36. The inlet and outlet chambers 78, 80 are typically configured to include a cross-section having a circular shape defining a diameter. The diameter is typically at least a one inch diameter. It is to be appreciated that the size of the inlet chamber 78 and the outlet chamber 80 may vary without departing from the nature of the present invention. For example, the inlet and outlet chambers 78, 80 are configured to accept a one inch (1") NPT fitting. It is to be appreciated that the connection type of the inlet and outlet chambers 78, 80 may vary from the NPT threads described above and may include, among others, SAE, JIC, ISO-G, flange style and compression fittings as well as manifold options.

The housing 76 further defines an opening 82. A bore 84 extends from the opening 82 into the housing 76, and generally into the inlet chamber 78. The bore 84 extends along a plane P, which intersects the outlet axis A. Typically, the plane P is angled relative to the outlet axis A. It is to be appreciated that the bore 84 extends along an axis that is defined by and coplanar with the plane P. For clarity, plane P is shown in the Figures as a line. However, it is to be appreciated that the plane P is two-dimensional, and as such, extends into and out of the Figures. Therefore, it is to be appreciated that while the axis along which the bore 84 extends may not intersect the outlet axis A, the plane P along which the bore 84 extends does intersect the outlet axis A, i.e., the bore 84 may be laterally offset from the outlet axis while the plane P along which the bore 84 extends still intersect the outlet axis A. The plane P and the outlet axis A define an angle therebetween with the opening of the housing 76 laterally offset from outlet axis A.

The plane P and the outlet axis A intersect within the housing 76 shown in the Figures. However, it is to be appreciated that the plane P and the outlet axis A may intersect at a point located outside of the housing 76. It should also be appreciated that the inlet chamber 78 and the outlet chamber 80 may or may not be in-line on a coincident outlet axis A, i.e., at a 0° offset. The present invention works equally well with any non-coincident outlet axis A for inlet chamber 78 and outlet chamber 80. It should also be appreciated that the plane P and the outlet axis A can intersect at any angle from 0°, i.e., inline, to 180°, i.e., reverse direction U-shaped flow path. Also, the plane P and the outlet axis A meet and intersect even at intermediate angles.

A flow control device 86 is disposed within the bore 84. The flow control device 86 defines a fluid passage 88. The fluid passage 88 interconnects the inlet chamber 78 and the outlet chamber 80. The flow control device 86 controls the fluid flow rate of the component between the inlet chamber 78 and the outlet chamber 80.

Referring to FIGS. 3-5, the flow control device 86 includes a piston 90. The piston 90 is moveable within the bore 84 along the plane P. The piston 90 includes a first end 92 and a second end 94. The first end 92 is disposed adjacent the inlet chamber 78 and defines an aperture 96. The second end 94 is disposed opposite the first end 92 along the plane P and defines at least one orifice 98. The second end typically defines a plurality of orifices 98 and an annular flow path 100. The inlet chamber 78 is in fluid communication with the aperture 96, the aperture 96 is in fluid communication with the at least one orifice 98, the at least one orifice 98 is in fluid communication with the annular flow path 100, and the annular flow path is in fluid communication with the outlet chamber 80. The fluid component flows from the inlet chamber 78, through the aperture 96, the orifice 98, and the annular flow path 100 of the piston 90, into the outlet chamber 80. Typically, the aperture 96 is in fluid communication with all of the orifices 98.

The aperture 96 includes a pre-determined cross-sectional area for regulating the fluid flow rate of the resin or isocyanate component. Preferably, the aperture 96 includes a circular cross-section having a pre-determined diameter. However, it is to be appreciated that the cross-sectional shape of the aperture 96 may vary, and that it is the cross-sectional area, the depth, and the contour of the leading and lagging edges that determines the fluid flow rate through the piston 90. It is to be appreciated that the piston 90 could also be comprised of two or more separate components such as a common piston body and an orifice 98 module, with the various apertures 96, assembled together into one assembly.

Referring to FIGS. 3 and 4, the outlet chamber 80 typically includes at least one entrance port 102, but may also define a plurality of entrance ports. The entrance port 102 is in fluid communication with the annular flow path 100 and the annular flow path 100 is in fluid communication with at least one orifice 98. The interface between the annular flow path 100 relative to the entrance port 100 defines a variable valve orifice 98. The variable valve orifice 98 created by the position of the annular flow path 100 relative to the entrance port 102 in the control valve 74 may be defined by a complete and uninterrupted ring whereas other devices typically utilize at least one partially blocked orifice 98 usually placed radially around the circumference. Utilizing the complete ring shaped variable orifice 98 maximizes the flow area for a given stroke, decreases the travel required to adjust the variable valve orifice 98 and therefore increase the sensitivity of the control valve 74. The annular flow path 100 and the entrance port 102 extend transverse to the plane P and the outlet axis A to intersect the outlet chamber 80. The resin or isocyanate component flows from the orifice 98, through the annular flow path 100, through the variable valve orifice 98, through the entrance port 102 and into the outlet chamber 80.

An adjustment mechanism 104 is coupled to the flow control device 86. The adjustment mechanism 104 adjusts the force against the piston 90 and proportionally the pressure drop across the aperture 96. The aperture 96 of the piston 90 and the applied spring force defines the fluid flow rate through the piston 90 and the adjustment mechanism 104 adjusts or alters the fluid flow rate to fine tune or customize the flow of the fluid component into the outlet chamber 80.

The adjustment mechanism 104 includes a head 106 in threaded engagement with the bore 84, and a spring 108 disposed along the plane P between the head 106 and the piston 90. The spring 108 is disposed within the bore 84 and abuts the piston 90. The head 106 includes a tool engaging recess adjacent the opening. The tool engaging recess provides an interface between the head 106 and a tool (not shown) to allow a user to rotate the head 106 about the plane P. It is to be appreciated that the head 106 will move along the plane P in response to threaded rotation about the plane P. Preferably, the tool engaging recess includes a hexagonal shape for engagement with an allen wrench. However, it is to be appreciated that the tool engaging recess may be configured differently than shown and described herein for engagement with some other tool.

The spring 108 is disposed between the head 106 and the piston 90 to urge the piston 90 68 along the plane P. In operation, the spring 108 is compressed between the head 106 and the piston 90 in response to the fluid pressure exerted by the resin or isocyanate component onto the piston 90. Accordingly, it is to be appreciated that at a given fluid pressure, the spring 108 is compressed a certain distance along the plane P. The distance the spring is compressed is dependent upon the spring constant of the spring 108. Therefore, varying the spring constant of the spring 108 will alter the flow rate through the control valve 74.

Advancement or retraction of the head 106 within the bore 84 compresses the spring 108 along the plane P and thereby adjusts the force against the piston 90 along the plane P. Accordingly, adjustment of the spring 108 adjusts the force against the piston 90 and therefore across the aperture 96 and the variable valve orifice 98 thus creating a controlled pressure drop across the aperture 96. Moving, i.e., realigning, the annular flow path 100 relative to the entrance port 102 alters the cross-sectional area of the variable valve orifice 98 between the annular flow path 100 and the entrance port 102 through which fluid component may flow. Altering the cross-sectional area between the annular flow path 100 and the entrance port 102 thereby adjusts the pressure drop of the fluid across the variable valve orifice 98. As the fluid flow rate tries to increase, the pressure drop across the aperture 96 increases thus creating a force against the piston 90. The increased force compresses the spring 108 and closes off the variable valve orifice 98 by minute movement of the piston 90 thus creating additional restriction and maintaining a constant flow.

The head 106 typically includes at least one seal 110 for sealing the bore 84. As shown, the seal 110 is disposed circumferentially about the head 106 in sealing engagement with the bore 84. The seal 110 prevents the fluid component from leaking through the bore 84. It is to be appreciated that the at least one seal 110 may include multiple seals and/or backup supports as shown. Preferably, the at least one seal 110 includes an annular o-ring gasket. However, it is to be appreciated that the seal 110 may include some other type of seal not shown or described herein, and may be located in some other place within the bore 84 to seal the bore 84.

The flow control device 86 and the adjustment mechanism 104 are disposed within the bore 84 with the adjustment mechanism 104 operable through the opening of the bore 84.

As described above, the opening 82 is laterally offset from the outlet axis A. Accordingly, the flow control device 86 and the adjustment mechanism 104 are removable from within the bore 84 of the housing 76 through the opening. Because the flow control device 86 and the adjustment mechanism 104 are removable through the bore 84, the control valve 74 need not be removed, nor loosened, from the lines connected to the inlet chamber 78 and the outlet chamber 80.

The control valve 74 can include a plurality of interchangeable flow control devices 86. The interchangeable flow control devices 86 are interchangeable in that the flow control valve 74 receives only one of the interchangeable flow control devices 86 at a time and one of the plurality of flow control devices 86 can be removed from the flow control valve 74 and replaced with another of the plurality of flow control valves 74. Each of the plurality of interchangeable flow control devices 86 has a different piston 90. The apertures 96 of each of the plurality of interchangeable pistons 90 includes a different pre-determined cross-sectional area. Accordingly, because the flow rate of the fluid is dependent upon the cross-sectional area of the aperture 96 as described above, the plurality of different pistons 90 provides a plurality of different fluid flow rates, i.e., each piston 90 provides a different fluid flow rate. Once again, because the flow control device 86 and the adjustment mechanism 104 are easily removable through the opening of the bore 84, the plurality of different pistons 90 are easily interchangeable without having to remove any connecting lines connected to the inlet chamber 78 and the outlet chamber 80. It is to be appreciated that only one flow control device 86 is shown in the Figures and that each of the plurality of flow control devices 86 can have similar configurations with the exception of the size of the aperture 96.

The flow control device 86 can be adjusted to vary the fluid communication between the fluid passage 88 and the inlet and outlet chambers 80 to establish the flow rate of the resin component and/or the isocyanate component to between 5 and 70 gallons per minute. In the scenario where both the resin component and the isocyanate component are pressurized with the source of gas pressure, both the resin component and the isocyanate component move through the flow control device 86 at between 5 and 70 gallons per minute. As such, the polyurethane foam exits the dispensing head 106 at between 10 and 140 gallons per minute.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A foam dispensing apparatus for dispensing a mixture of a resin component and an isocyanate component, said foam dispensing apparatus comprising:
   a resin line for carrying the resin component;
   an isocyanate line for carrying the isocyanate component;
   a nozzle for dispensing the resin and isocyanate components from the foam dispensing apparatus;
   a manifold connected to said nozzle and defining a resin duct in communication with said resin line and said nozzle for directing the resin component toward said nozzle and an isocyanate duct in communication with said isocyanate line and said nozzle for directing the isocyanate component toward said nozzle;
   at least one valve connected in-line to said resin and isocyanate lines and being moveable between an open position allowing flow through said resin and isocyanate lines and a closed position preventing flow through said resin and isocyanate lines;
   wherein said at least one valve is disposed exterior and spaced upstream from said manifold and wherein the flow is unregulated in said manifold for reducing maintenance of said manifold;
   at least one gas line in communication with at least one of said resin and isocyanate lines between said valve and said manifold for flushing said resin and isocyanate lines;
   an actuator coupled to said at least one valve for moving said at least one valve between said open and closed positions;
   a timer in communication with said actuator for controlling said actuator; and
   at least one control valve in line with at least one of said resin line and said isocyanate line prior to said at least one valve to vary and control a flow rate of at least one of the resin component and the isocyanate component therethrough and being externally adjustable of flow control without disassembling the at least one of said resin line and said isocyanate line; and wherein said at least one control valve includes a housing defining an inlet chamber and an outlet chamber spaced from each other along a first axis and a bore extending along a second axis that is angled relative to the first axis and intersecting within said housing, wherein said at least one control valve includes a flow control device disposed in said bore and interconnecting said inlet chamber and said outlet chamber for controlling fluid flow rate between said inlet chamber and said outlet chamber;
   wherein said flow control device includes a piston moveable within said bore having a first end disposed adjacent said inlet chamber and defining an aperture and a second end disposed opposite said first end and defining at least one orifice and an annular flow path in fluid communication with said outlet chamber, said aperture including a pre-determined cross-sectional area for regulating the fluid flow rate of one of the resin component and the isocyanate component.

2. The foam dispensing apparatus as set forth in claim 1 wherein said resin duct and said isocyanate duct are continuous and uninterrupted from said resin line and said isocyanate line, respectively, to said nozzle.

3. The foam dispensing apparatus as set forth in claim 1 wherein said manifold is formed of a single integral piece.

4. The foam dispensing apparatus as set forth in claim 1 wherein said actuator is pneumatically controlled.

5. The foam dispensing apparatus as set forth in claim 1 wherein said at least one valve is further defined as a ball valve.

6. The foam dispensing apparatus as set forth in claim 1 wherein said manifold defines cleaning ports in communication with said resin duct and said isocyanate duct for supplying cleaning liquids and/or cleaning fluids to flush said resin and isocyanate ducts.

7. The foam dispensing apparatus as set forth in claim 1 wherein said resin line and said isocyanate line are pressurized to between 100 and 500 pounds per square inch.

8. The foam dispensing apparatus as set forth in claim 1 wherein said flow rate is between 5 and 70 gallons per minute.

9. The foam dispensing apparatus as set forth in claim 1 wherein said resin duct and said isocyanate duct are separate from each other between said resin and isocyanate lines, respectively, and said nozzle such that the resin and isocyanate components first mix in said nozzle.

10. The foam dispensing apparatus as set forth in claim 9 wherein said nozzle is removable from said manifold for cleaning.

11. The foam dispensing apparatus as set forth in claim 1 wherein said at least one valve is further defined as a resin valve connected to said resin line and an isocyanate valve connected to said isocyanate line.

12. The foam dispensing apparatus as set forth in claim 11 wherein said resin and isocyanate valves are both further defined as pneumatically actuated ball valves.

13. A foam dispensing system for dispensing a mixture of a resin component and an isocyanate component, said foam dispensing system comprising:
- a source of resin component;
- a source of isocyanate component;
- a nozzle for mixing the resin and isocyanate components;
- a manifold connected to said nozzle and defining a resin duct in communication with said source of resin component and said nozzle for directing the resin component toward said nozzle and an isocyanate duct in communication with said source of isocyanate component and said nozzle for directing the isocyanate component toward said nozzle;
- a resin line coupling said source of resin component to said resin duct;
- an isocyanate line coupling said source of isocyanate component to said isocyanate duct;
- at least one valve connected in-line to said resin and isocyanate lines and being moveable between an open position allowing flow through said resin and isocyanate lines and a closed position preventing flow through said resin and isocyanate lines;
- wherein said at least one valve is disposed exterior to and spaced upstream from said manifold and wherein the flow is unregulated in said manifold for reducing maintenance of said manifold;
- at least one gas line in communication with at least one of said resin and isocyanate lines between said valve and said manifold for flushing said resin and isocyanate lines;
- an actuator coupled to said at least one valve for moving said at least one valve between said open and closed positions;
- a timer in communication with said actuator for controlling said actuator; and
- at least one control valve in line with said resin line and said isocyanate line prior to said at least one valve to vary and control a flow rate of the resin component and the isocyanate component therethrough and being externally adjustable of flow control without disassembling said resin line and said isocyanate line;
- wherein said at least one control valve includes a housing defining an inlet chamber and an outlet chamber spaced from each other along a first axis and a bore extending along a second axis that is angled relative to the first axis and intersecting within said housing, wherein said at least one control valve includes a flow control device disposed in said bore and interconnecting said inlet chamber and said outlet chamber for controlling fluid flow rate between said inlet chamber and said outlet chamber; and
- wherein said flow control device includes a piston moveable within said bore having a first end disposed adjacent said inlet chamber and defining an aperture and a second end disposed opposite said first end and defining a plurality of orifices and an annular flow path in fluid communication with said outlet chamber, said aperture including a pre-determined cross-sectional area for regulating the fluid flow rate of one of the resin component and the isocyanate component.

14. The foam dispensing system as set forth in claim 13 wherein said resin duct and said isocyanate duct are continuous and uninterrupted from said resin line and said isocyanate line, respectively, to said nozzle.

15. The foam dispensing system as set forth in claim 13 wherein said manifold is formed of single integral piece.

16. The foam dispensing system as set forth in claim 13 wherein said actuator is pneumatically controlled.

17. The foam dispensing system as set forth in claim 13 further comprising a source of compressed gas in communication with said sources of resin component and isocyanate component for pressurizing the resin and isocyanate components to move the resin and isocyanate components through the resin and isocyanate lines, respectively.

18. The foam dispensing system as set forth in claim 17 wherein said source of compressed gas pressurized the sources of resin component and isocyanate component to between 100 and 500 pounds per square inch.

19. The foam dispensing system as set forth in claim 13 wherein said manifold defines cleaning ports in communication with said resin duct and said isocyanate duct for supplying cleaning liquids and/or cleaning fluids to flush said resin and isocyanate ducts.

* * * * *